(12) United States Patent
McDaniel et al.

(10) Patent No.: US 6,362,478 B1
(45) Date of Patent: Mar. 26, 2002

(54) RADIATION DETECTOR SIGNAL PULSE CLIPPING

(75) Inventors: David L. McDaniel, Dousman; James E. Scarlett, Hartland, both of WI (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/504,093

(22) Filed: Feb. 14, 2000

(51) Int. Cl.[7] .................................................. G01T 1/20
(52) U.S. Cl. ................................... 250/361 R; 250/369
(58) Field of Search ............................. 250/369, 363.09, 250/214 R, 214 A, 361 R

(56) References Cited

U.S. PATENT DOCUMENTS 3,801,972 A * 4/1974 Ho Kim et al. ............. 340/510
4,472,715 A * 9/1984 Kern et al. .................. 340/587
5,241,181 A * 8/1993 Mertens et al. ......... 250/363.03
5,272,343 A * 12/1993 Stearns .................. 250/363.03
5,337,091 A * 8/1994 Harford et al. ............. 348/347

* cited by examiner

Primary Examiner—Ricky Mack
(74) Attorney, Agent, or Firm—George E. Haas; Quarles & Brady LLP

(57) ABSTRACT

A radiation detector emits a signal containing pulses produced by each radiation event being detected. The pulses tend to decay and may overlap the pulse from a subsequent radiation. In order to prevent such pulse overlap a circuit is provided to clip the signal pulses. The circuit incorporates an analog delay line which produces a delayed, inverted and attenuated reflection of the original detector signal. The reflection signal is combined with the original detector signal to cancel remnants of each pulse lasting longer than the predefined delay period.

16 Claims, 3 Drawing Sheets

RADIATION DETECTOR SIGNAL PULSE CLIPPING

BACKGROUND OF THE INVENTION

The present invention relates to nuclear medicine imaging systems, such as positron emission tomography (PET) scanners; and particularly to circuits for processing signals from radiation detectors in such systems.

Positrons are positively charged electrons which are emitted by radionuclides that have been prepared using a cyclotron or other device. These are employed as radioactive tracers called "radiopharmaceuticals" by incorporating them into substances, such as glucose or carbon dioxide. The radiopharmaceuticals are injected into a patient and become involved in such processes as blood flow, glucose metabolism, fatty acids, and protein synthesis.

Positrons are emitted as the radionuclides decay. The positrons travel a very short distance before they encounter an electron, and when this occurs, they are annihilated and converted into two photons, or gamma rays. This annihilation event is characterized by two features which are pertinent to PET scanners—each gamma ray has an energy of 511 keV and the two gamma rays are directed in nearly opposite directions. An image is created by determining the number of such annihilation events at each location within the field of view.

The PET scanner includes one or more rings of detectors which encircle the patient. Each detector includes a scintillator which converts the energy of each 511 keV photon into a flash of light that is sensed by a photomultiplier tube (PMT). Coincidence detection circuits connect to the detectors and record only those photons which are detected simultaneously by two detectors located on opposite sides of the patient. The number of such simultaneous events indicates the number of positron annihilations that occurred along a line joining the two opposing detectors. Within a few minutes hundreds of million of events are recorded to indicate the number of annihilations along lines joining pairs of detectors in the ring. These numbers are employed to reconstruct an image using well known computed tomography techniques.

Upon stimulation by a gamma ray, the scintillators do not emit light instantaneously, instead the light is emitted with an intensity that decays exponentially with time. The energy of the gamma ray is determined by integrating the single from the light sensor over the duration of the light pulse. The duration of that light pulse limits the rate in which the gamma rays can be detected and processed. With reference to FIG. 1 consider two gamma rays that interact with the scintillator at times T1 and T2. The second gamma ray strikes the scintillator at time T2 which occurs during the light pulse produced by the first gamma ray striking the scintillator at time T1. Thus, when the processing circuit integrates the signal from the photomultiplier the portion of the signal from the gamma ray which occurs after time T2 (indicated by the crosshatched area on the drawing) will be integrated along with the signal produced by the second gamma ray striking the scintillator. Thus, the signals from the two gamma rays will "pile up" and not be processed correctly as individual gamma ray invents. Thus, it will appear as though the second gamma ray occurrence has a much greater signal.

Several methods have been developed to produce and correct the effect of pile up on the process signal. One such method is referred to as a variable integration with pulse tail extrapolation. In this method, the integration of the first pulse is stopped when the second pulse occurs. The integration value of the first pulse and the time between the first pulse and the second pulse is used to calculate a correction to the integrated value for the first gamma ray pulse because of the shorter integration time that is used. A correction for the portion of the first pulse is included with the integral of the second pulse. However, the circuitry required for this method is often too complex and expensive for practical application on imaging systems that contain a large number of light sensors and signal processing channels.

Another method of reducing pile up was described by E. Tanaka et al. entitled "Variable Sampling-Time For Improving Count Rate Performance Of Scintillator Detectors", *Nuclear Instruments And Methods*158, 1989, pp. 459–466. This method generates a delayed, inverted and attenuated reflection of the original detector signal by means of analog delay line. The attenuation of the reflected pulse is chosen such that:

$$Ar(t)=-Ao(t-td) \exp(-td/Tc)$$

where Ar(t) is the amplitude of the reflected pulse, Ao(t−Td) is the amplitude of the original signal, Td is the delay between the original signal and the reflected signal, and Tc is a decay time constant of the scintillator. The original and reflected pulses then are summed to give a clipped pulse as in an output signal as shown in FIG. 2. The output signal is given by the expression:

$$As(t)=Ao(T)+Ar(T)$$

since Ao(T) is given by:

$$Ao(T) = 0 \qquad\qquad\qquad\qquad t < 0$$
$$Ao(T) = Ao(t = 0)\exp(-t/Tc) \quad t > 0$$

then $$As(t) = 0 \qquad t < 0$$
$$As(t) = Ao(t) \quad 0 < t < Td$$
$$As(t) = 0 \qquad t < Td$$

FIGS. 3 and 4 show pre-amplifier circuits that use the delay line clipping method to shorten signals from a scintillator and photomultiplier tube (PMT). In FIG. 3, current from the photomultiplier is dropped across resistor RA to generate a voltage signal which is amplified by amplifier A1 that acts as an input buffer for the clipping circuit. The clipping circuit consists of a load resistor RB, a delay line DL and a terminating resistor RC. The value of the load resistor RL is chosen to equal the characteristic impedance of the delay line DL and the value of resistor RC is chosen so that the reflected signal has the correct amplitude. A second amplifier A2 functions as a driver to isolate the impedance of the output cable from the clipping circuit. Resistor RD is chosen to match the characteristic impedance of the output cable. This circuit has a drawback in that it requires two high performance amplifiers.

As an alternative, the circuit in FIG. 4 eliminates one of the amplifiers in the previous circuit by taking advantage of the high impedance output of the photomultiplier tube. The clipping circuit again consists of a load resistor RE, a delay line DL and its terminating resistor RF. The value of load resistor RE is chosen to equal the characteristic impedance of the delay line and the value of resistor RF is chosen so that the reflective signal has the correct amplitude. The current from the photomultiplier tube is dropped across the load resistance RE and the delay line which give an equivalent resistance of one-half RE. The sole amplifier A1 amplifies the voltage signal and acts as a driver to isolate the impedance of the output cable. Although this latter utilizes only a signal amplifier, it has the drawback that the impedance used to convert the photomultiplier signal to a voltage depends upon the impedance of the delay line. If a standard low impedance delay line is employed, the gain required in the amplifier can become very large which may cause performance and stability problems. If the gain of the amplifier is kept low, a high impedance delay line must be used which are relatively large, have limited availability and are relatively expensive.

SUMMARY OF THE INVENTION

A circuit for clipping pulses in a signal from a radiation detector such as one that is incorporated in a nuclear medicine imaging system. That circuit has a first node connected to the radiation detector for receiving the signal, a second node, and a third node to which a reference voltage level is applied. In the preferred embodiment of the present invention the third node is coupled to circuit ground. An impedance element is connected between the first and second nodes to provide the desired total load to the PMT. As used herein, an impedance element is an electrical circuit component that has more than a negligible impedance, for example a conductor would not be considered as an impedance element.

A signal delay element, such as an analog delay line for example, has an input connected to the second node and has an output that is coupled to the third node. In the preferred embodiment, another impedance element couples the delay line output to the third node. A load element is connected between the second node and the third node, and has an impedance that matches the impedance of the signal delay element. An amplifier includes a signal input that is connected to the first node and includes a signal output at which is produced the output signal of the circuit for clipping pulses.

DESCRIPTION OF THE PREFERRED EMBODIMENT

Figure 5:
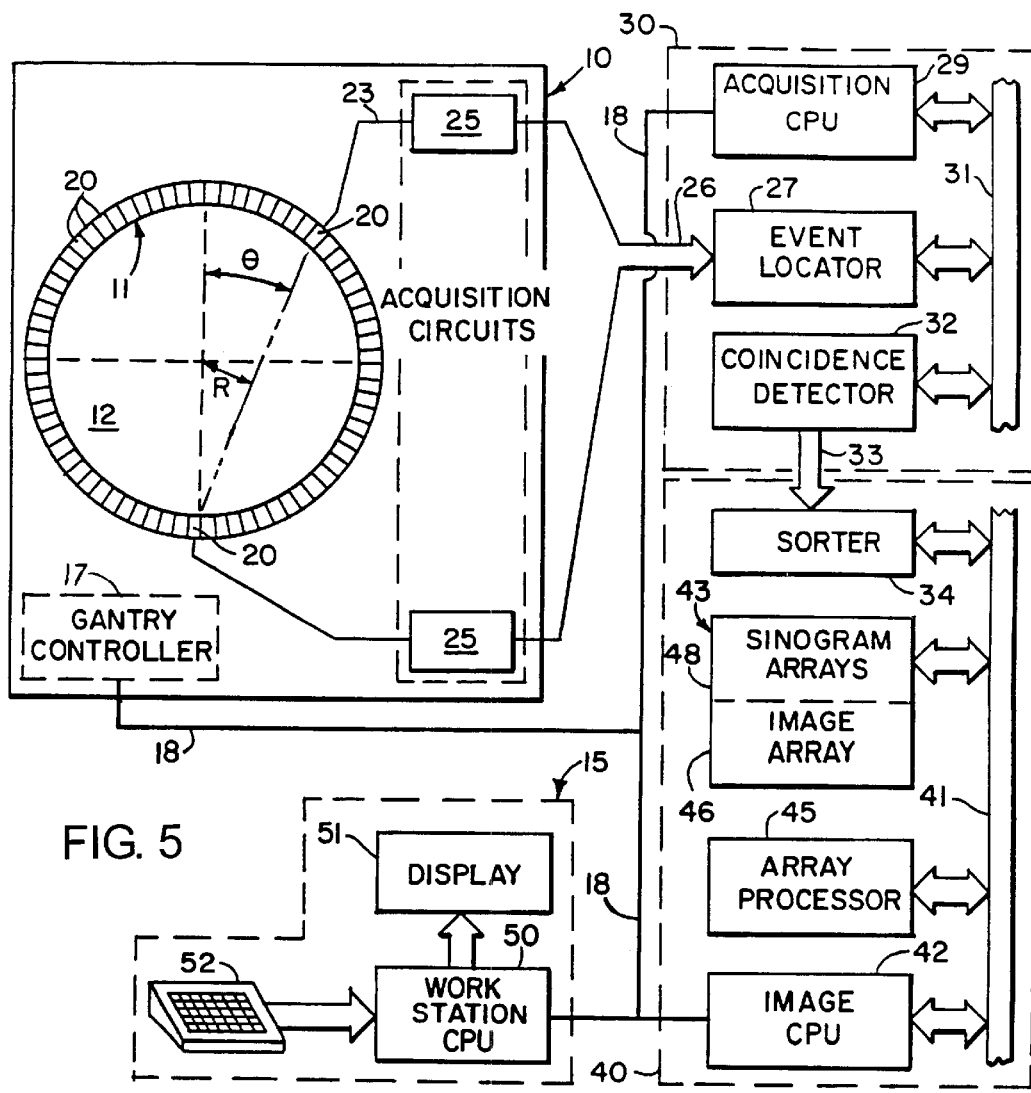
FIG. 5 is a schematic diagram of a PET scanner system in which the present invention is incorporated.

Referring to FIG. 5, the PET scanner system includes a gantry 10 which supports a detector ring assembly 11 about a central opening, or bore 12. A patient to be examined is positioned in front of the gantry 10 and is aligned with the central axis of the bore 12. A motorized patient table (not shown) moves the patient into the bore 12 in response to commands received from an operator work station 15. A gantry controller 17 is mounted within the gantry 10 and responds to commands received from the operator work station 15 through a serial communication link 18 to operate the gantry.

Figure 6:
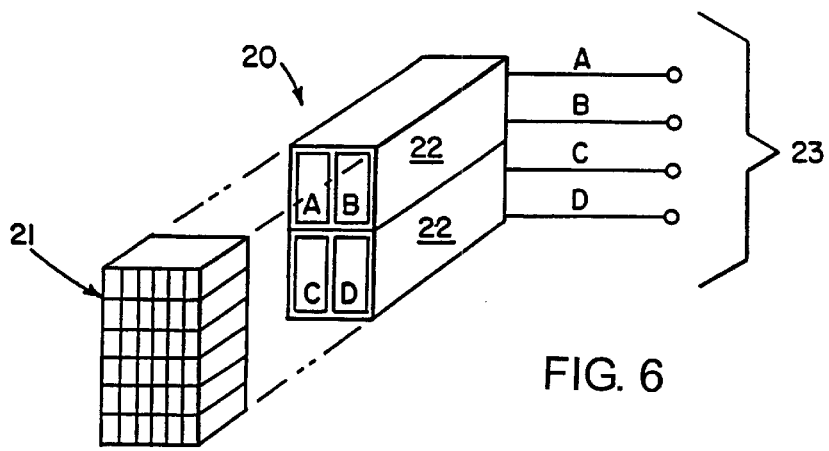
FIG. 6 is a pictorial view of a radiation detector which forms part of the PET scanner system of FIG. 5.

With additional reference to FIG. 6, the detector ring 11 is comprised of 336 radiation detectors 20. Each detector 20 includes a set of scintillator crystals 21 (referred to as BGO crystals) arranged in a matrix and disposed in front of four photomultiplier tubes 22 (abbreviated PMT). Each PMT 22 produces an analog signal on one of the conductors 23 when a scintillation event occurs. A set of acquisition circuits 25 are mounted within the gantry 10 to receive these signals and produce digital signals indicating the event coordinates (x,y) and the total energy. These digital signals are sent through a cable 26 to an event locator circuit 27 housed in a separate cabinet from the gantry. Each acquisition circuit 25 also produces an event detection pulse which indicates the exact moment the scintillation event took place.

The event locator circuits 27 form part of a data acquisition processor 30 which periodically processes the signals produced by the acquisition circuits 25. The processor 30 has an acquisition CPU 29 which controls communications on the serial communication link 18 and a backplane bus 31. The event locator circuits 27 assemble the information regarding each valid event into a set of digital numbers that indicate precisely when the event took place and the position of the BGO crystal 21 which detected the radiation event. This event data packet is conveyed to a coincidence detector 32 which also is part of data acquisition processor 30.

The coincidence detector 32 accepts the event data packets from the event locators 27 and determines if any two of them are in coincidence. Coincidence is determined by a number of factors. First, the time markers in each event data packet must be within 12.5 nanoseconds of each other, and second, the locations indicated by the two event data packets must lie on a straight line which passes through the field of view in the scanner bore 12. Events which cannot be paired are discarded, but coincident event pairs are located and recorded as a coincidence data packet that is conveyed through a serial link 33 to a sorter 34. For a detailed description of the coincidence detector 32, reference is made to U.S. Pat. No. 5,241,181 entitled "Coincidence Detector For A PET Scanner" which is incorporated herein by reference.

The sorter 34 forms part of an image reconstruction processor 40. The sorter 34 counts all events occurring along each projection ray (R,θ) and organizes them into a two dimensional sinogram array 48 which is stored in a memory module 43. The image reconstruction processor 40 also includes an image CPU 42 that controls a backplane bus 41 and links it to the serial communication link 18. An array processor 45 also connects to the backplane 41 and it reconstructs images from the sinogram arrays 48. The resulting image array 46 is stored in memory module 43 and is output by the image CPU 42 to the operator work station 15. For a detailed description of the sorter 34, reference is made to U.S. Pat. No. 5,272,343 entitled "Sorter For Coincidence timing Calibration In A PET Scanner" which is incorporated herein by reference.

The operator work station 15 includes a central processing unit (CPU) 50, a cathode ray tube (CRT) monitor 51 and a keyboard 52. The CPU 50 connects to the serial communication link 18 and it scans the keyboard 52 for input information. Through the keyboard 52 and associated control panel switches, the operator can control the calibration of the PET scanner, its configuration, and the positioning of the patient table for a scan. Similarly, the operator can display the resulting image on the CRT monitor 51 and perform image enhancement functions using programs executed by the work station CPU 50.

Figure 7:
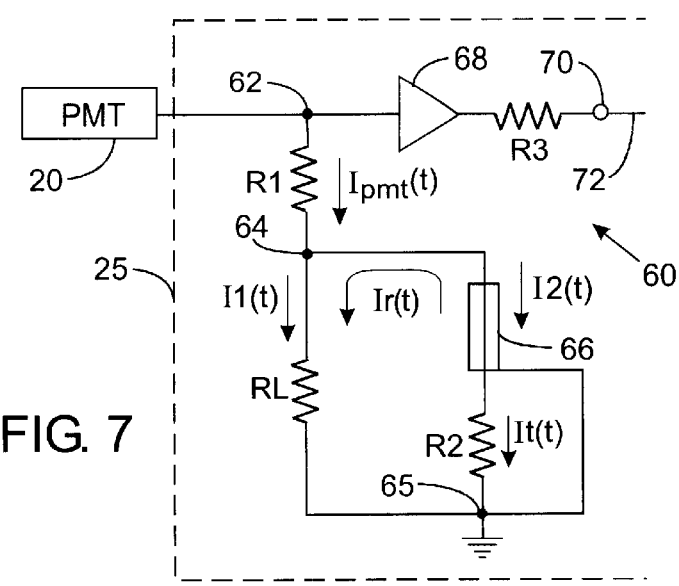
FIG. 7 is a schematic diagram of a pulse shortening circuit according to the present invention.

With reference to FIG. 7, the input of each acquisition circuit 25 includes a separate pulse clipping circuit 60 that is connected to the output of one of the photomultiplier tubes 20. This clipping circuit 60 utilizes a signal amplifier and allows the load resistance for the photomultiplier tube to be selected independently of the resistance of the delay line.

The clipping circuit 60 has a first, or input, node 62 to which the output of the photomultiplier tube 20 is connected. A first resistor R1 and a load resistor RL are connected in series between the first node 62 and circuit ground with a second node 64 formed between the two resistors R1 and RL. A signal delay element, such as an analog delay line 66, has an input connected to the second node 64 and has an output connected by a second resistor R2 to the circuit ground 65. The first resistor R1 serves as a impedance element which has an impedance that is chosen to produce the desired output voltage level from the photomultiplier tube. The load resistor RL has a value which matches the impedance of the delay line and second resistor R2 has a value which is chosen so that reflected signal will have the proper amplitude.

The first, or input, node 62 also is connected to the input of an amplifier 68 with an output that is coupled by a third resistor R3 to the output terminal 70 of the clipping circuit 60. The resistance of the third resistor R3 matches the characteristic impedance of the conductor 72 connected to output terminal 70.

Operation of the clipping circuit 60 is best understood by analyzing the currents, as depicted in FIG. 7, which flow in response to a gamma ray event. For such analysis the input impedance of the amplifier 68 and the impedance of the photomultiplier tube 20 are treated as being infinite. The current signal from the PMT is designated as Ipmt (t) and is dropped across the first resistor R1. That current then divides into I1 (t), which flows through the load resistor RL, and I2(t), which flows through the delay line 66. Because the resistance of load resistor RL matches the characteristic impedance of the delay line 66, equal currents flow through the load resistor and the delay line with each current being equal to one-half the PMT output current Ipmt (t).

The current I2(t−td) at the output of the delay line 66 is partially transmitted through the second resistor R2 to circuit ground 65 with that current being referred to as It(t). The remainder of the current Ir(t) is reflected back through the delay line and after passing through the delay line the reflected current Ir(t−td) is dropped across the second resistor RL.

It should be noted that the input of the delay line is impedance matched so that neither I2(t) nor Ir(t−td) generates a reflective current at the input of the delay line. The amplitude of the reflected current Ir(t) is determined by the input mismatch at the output of the delay line and is given by the expression:

$$Ir(t)=(R2-RL)/(R2+RL)*I2(t-td) =\tfrac{1}{2}(R2-RL)/(R2+RL)*Ipmt\ (t-d)$$

For t<2td, the input voltage to the amplifier is given by:

$$Vamp(t)=Ipmt\ (t)*R1+I1(t)*RL =Ipmt(t)*(R1+\tfrac{1}{2}RL)$$

For t>2td, the input voltage to the amplifier is given by:

$$Vamp(t)=Ipmt(t)*R1+(I1(t)+Ir(t-td))*RL =Ipmt(t)*R1+(\tfrac{1}{2}Ipmt(t)+\tfrac{1}{2}Ipmt(t-2td)*(R2-RL)/(R2+RL))*RL =Ipmt(t)*(R1+\tfrac{1}{2}RL)+\tfrac{1}{2}Ipmt(t-2td)*(R2-RL)/(R2+RL))*RL$$

For Ipmt(t)=Ipmt(0)*exp(−t/Tc) and t>2td, $$Vamp(t)=Ipmt(0)*exp(-t/Tc)*\ (R1+\tfrac{1}{2}RL+\tfrac{1}{2}exp(2td/Tc)*(R2-RL)/(R2+RL)*RL)$$

The circuit will clip the PMT output signal for t>2td if R2 is chosen so that:

$$R1+\tfrac{1}{2}RL+\tfrac{1}{2}exp(2td/Tc)*(R2-RL)/(R2+RL)*RL=0$$

That is, $$R2=RL*(RL-(2R1+RL)*exp(-2*td/Tc))/(RL+(2R1+RL)*exp(-2*td/Tc))$$

EXAMPLE

Figure 1:
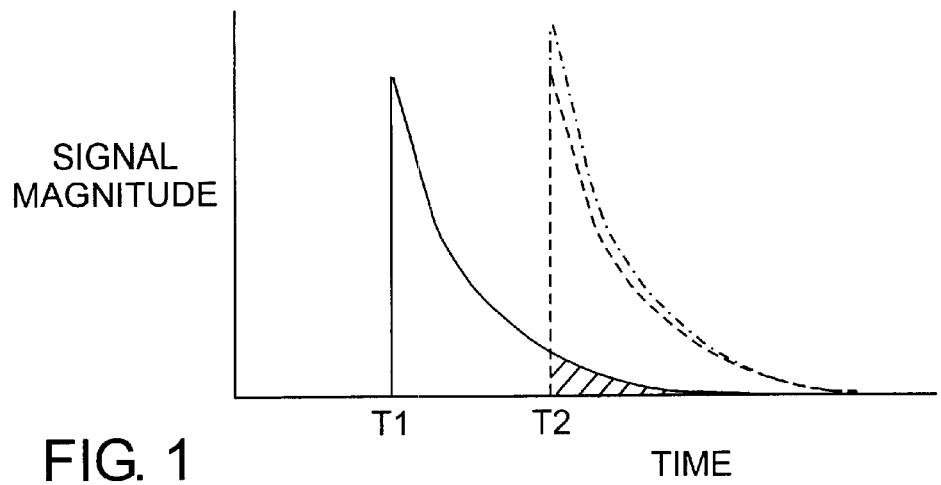
FIG. 1 is a graph depicting the signals produced by two gamma rays striking the detector in the PET scanner.
Figure 2:
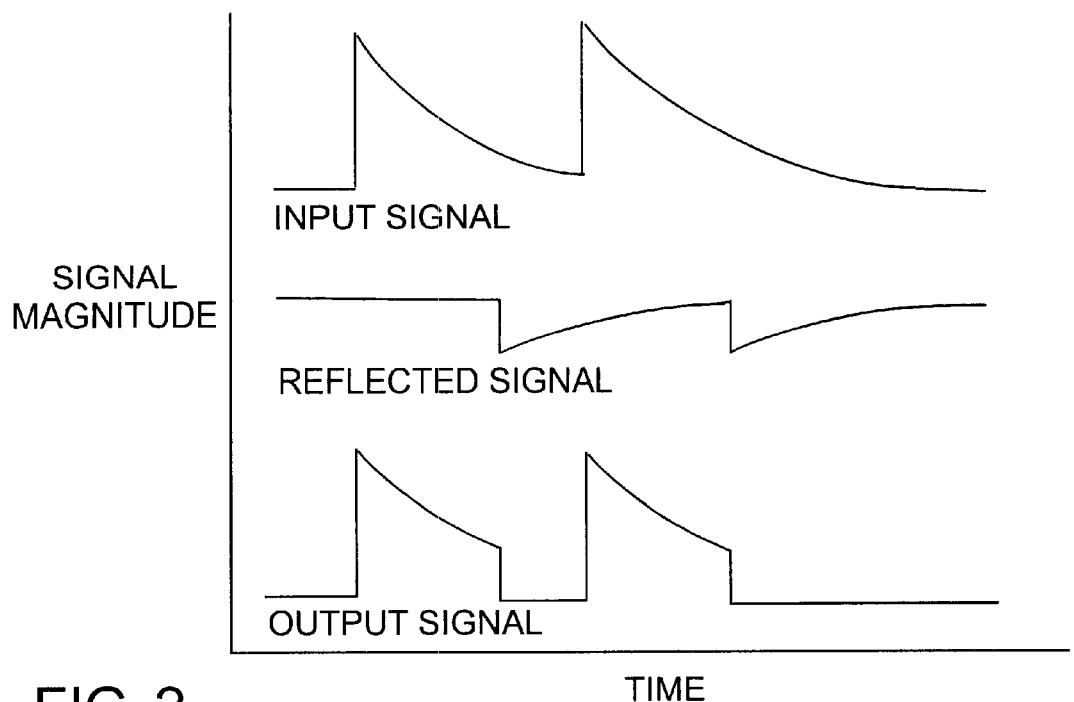
FIG. 2 graphically illustrates processing the detector signal by the delay line pulse shortening method.
Figure 3:
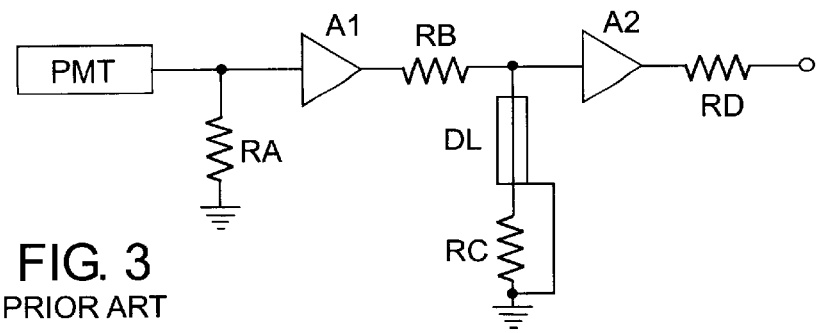
FIG. 3 is one embodiment of a prior art delay line circuit for performing the pulse shortening.
Figure 4:
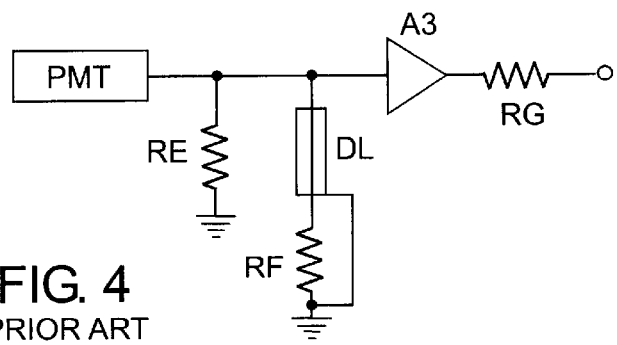
FIG. 4 is another embodiment of a prior art pulse shortening circuit.

To better understand the advantage of the present clipping circuit 60, consider a PET scanner in which the PMT signal from a BGO detector (time decay constant Tc=300 nanoseconds) is required to be dropped over an effective impedance of 180 ohms and clipped after 400 nanoseconds. If the prior art circuit in FIG. 4 is employed, the third resistor RF will have a value of 210 ohms and the delay line needs to have an input impedance of 360 ohms. In the clipping circuit in FIG. 7 according to the present invention, these requirements can be met using a standard 100 ohm delay line and by selecting 130 ohms for the first resistor R1. The second resistor R2 can be set to zero oh ms, in other words, the output of the delay line is coupled directly to circuit ground 65. As used herein the term "coupled directly" means a connection that has negligible impedance. However, in order to ensure that the reflected signal has the proper amplitude, an impedance element, such as a resistor, may couple the output of the delay line to circuit ground 65. In any event, the present invention enables the use of a 100 ohm delay line, which is more readily available and less expensive than a 360 ohm delay line required by the prior art circuit.

What is claimed is:

1. A circuit for clipping pulses in a signal from a radiation detector wherein the signal has a component which decays exponentially, the combination comprising:

a first node connected to the radiation detector for receiving the signal;

a second node;

a third node to which a reference voltage level is applied;

a first impedance element connected between the first node and second node;

a signal delay element having an input connected to the second node and having an output coupled to the third node, the signal delay element having a first impedance;

a load element connected between the second node and the third node, and having a second impedance that matches the first impedance of the signal delay element; and an amplifier having a signal input connected to the first node and having a signal output at which is produced an output signal from the circuit for clipping pulses.

2. The circuit for clipping pulses as recited in claim 1 wherein the third node is connected to circuit ground.

3. The circuit for clipping pulses as recited in claim 1 further comprising a second impedance element coupling the output of the signal delay element to the third node.

4. The circuit for clipping pulses as recited in claim 1 further comprising a resistor coupling the output of the signal delay element to the third node.

5. The circuit for clipping pulses as recited in claim 1 wherein the output of the signal delay element is coupled directly to the third node.

6. The circuit for clipping pulses as recited in claim 1 further comprising an output conductor and an impedance matching element coupling the signal output of the amplifier to the output conductor.

7. The circuit for clipping pulses as recited in claim 6 wherein the output conductor has a characteristic impedance, and the impedance matching element has a impedance that matches the characteristic impedance.

8. The circuit for clipping pulses as recited in claim 1 wherein the first impedance element and the load element are resistors.

9. The circuit for clipping pulses as recited in claim 1 wherein the signal delay element is an analog delay line.

10. In a nuclear medicine imaging system having a radiation detector that includes a scintillator, which converts radiation emanating from a patient into light, and a photomultiplier tube with an output terminal at which is produced a signal indicative of an amount of light produced by the scintillator, the combination comprising:

a first resistor and a load resistor connected in series between the output terminal and circuit ground with a node being formed between the first resistor and a load resistor;

a signal delay element having an input connected to the node and an output coupled to circuit ground; and an amplifier having a signal input connected to the output terminal and having a signal output.

11. The circuit for clipping pulses as recited in claim 10 further comprising a second resistor coupling the output of the signal delay element to circuit ground.

12. The circuit for clipping pulses as recited in claim 10 wherein the output of the signal delay element is coupled directly to circuit ground.

13. The medical imaging system as recited in claim 10 further comprising an output conductor and another resistor coupling the signal output of the amplifier to the output conductor.

14. The medical imaging system as recited in claim 10 further comprising an output conductor with a characteristic impedance; and another resistor coupling the signal output of the amplifier to the output conductor and having a resistance that matches the characteristic impedance.

15. The circuit for clipping pulses as recited in claim 10 wherein the signal delay element is an analog delay line.

16. The circuit (60) for clipping pulses as recited in claim 10 wherein the signal delay element (66) is a delay line.

* * * * *